United States Patent
Wang et al.

(10) Patent No.: US 10,608,514 B2
(45) Date of Patent: Mar. 31, 2020

(54) ELECTRICITY AND AIR SUPPLYING EQUIPMENT

(71) Applicants: Yao-Lin Wang, Taichung (TW); Chong-Ying Wang, Taichung (TW)

(72) Inventors: Yao-Lin Wang, Taichung (TW); Chong-Ying Wang, Taichung (TW)

( * ) Notice: Subject to any disclaimer, the term of this patent is extended or adjusted under 35 U.S.C. 154(b) by 0 days.

(21) Appl. No.: 16/204,488

(22) Filed: Nov. 29, 2018

(65) Prior Publication Data

US 2019/0229598 A1  Jul. 25, 2019

(30) Foreign Application Priority Data

Jan. 22, 2018 (TW) .............................. 107201029 U

(51) Int. Cl.
| | |
|---|---|
| *H02K 7/00* | (2006.01) |
| *H02K 19/34* | (2006.01) |
| *H02K 7/108* | (2006.01) |
| *F04D 25/06* | (2006.01) |
| *H02K 7/18* | (2006.01) |

(Continued)

(52) U.S. Cl.
CPC ........... *H02K 19/34* (2013.01); *F02B 63/042* (2013.01); *F02B 63/047* (2013.01); *F02B 63/06* (2013.01); *F04B 41/00* (2013.01); *F04D 25/0606* (2013.01); *H02K 7/108* (2013.01); *H02K 7/1815* (2013.01)

(58) Field of Classification Search
CPC .... F04B 41/00; F04D 25/0606; F02B 63/042; F02B 63/047; F02B 63/06
USPC ................... 290/1 A, 4 A, 4 C, 4 D; 60/698; 123/198 R
See application file for complete search history.

(56) References Cited

U.S. PATENT DOCUMENTS 3,534,634 A * 10/1970 Kawanami ................ F16H 7/14
 474/84
3,646,773 A *  3/1972 Falk ........................ F25B 13/00
 62/160

(Continued)

FOREIGN PATENT DOCUMENTS

CN  202954999 U  *  5/2013
KR  101236505 B1 *  2/2013

OTHER PUBLICATIONS

KR 101236505 English Machine Translation. Jung Choon Youn, 2013.*

*Primary Examiner* — Julio C. Gonzalez
(74) *Attorney, Agent, or Firm* — Egbert Law Offices, PLLC

(57) ABSTRACT

A type of electricity and air supplying equipment, which includes: a clutch mechanism, a belt assembly, a motor having a transmission shaft, a generator unit having a generating wheel, and an air compressor having an air compressing wheel. The clutch mechanism has first and second clutch shafts that can be engaged or disengaged. The belt assembly includes a first belt connected between the transmission shaft and the generating wheel, a second belt connected between the generating wheel and the first clutch shaft, and a third belt connected between the second clutch shaft and the air compressing wheel. The motor drives the generator unit to run and generate electricity, and meanwhile, the generator unit drives the air compressor through the clutch mechanism. Thus, the equipment can use single power for electricity generation and high-pressure air production, while providing heat insulation and easy assembly.

4 Claims, 3 Drawing Sheets

(51) Int. Cl.
  *F02B 63/04*   (2006.01)
  *F04B 41/00*   (2006.01)
  *F02B 63/06*   (2006.01)

(56) References Cited

U.S. PATENT DOCUMENTS

| | | | | |
|---|---|---|---|---|
| 3,765,180 | A * | 10/1973 | Brown | F01B 17/02 |
| | | | | 60/370 |
| 4,010,378 | A * | 3/1977 | Tharpe | B60H 1/00007 |
| | | | | 290/2 |
| 4,093,055 | A * | 6/1978 | Blackburn | A23G 9/12 |
| | | | | 192/108 |
| 4,405,028 | A * | 9/1983 | Price | B60K 25/00 |
| | | | | 180/65.7 |
| 5,260,617 | A * | 11/1993 | Leibowitz | H02K 16/00 |
| | | | | 290/6 |
| 6,414,399 | B1 * | 7/2002 | Bianchi | B63J 1/00 |
| | | | | 290/1 A |
| 6,914,341 | B1 * | 7/2005 | McIntyre | H02K 53/00 |
| | | | | 180/65.1 |
| 7,262,533 | B2 * | 8/2007 | Fiset | H02K 16/00 |
| | | | | 310/113 |
| 8,491,274 | B2 * | 7/2013 | Taylor | F04C 29/0064 |
| | | | | 192/48.2 |
| 9,725,179 | B2 * | 8/2017 | Aubert | H02K 7/116 |
| 9,956,850 | B2 * | 5/2018 | Casasanta | B60L 1/003 |

* cited by examiner

ELECTRICITY AND AIR SUPPLYING EQUIPMENT

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to generators, and more particularly to supplying equipment that can supply both electricity and high-pressure air.

2. Description of Related Art Including Information Disclosed Under 37 CFR 1.97 and 37 CFR 1.98.

To facilitate some manufacturing processes, the inventor developed a prototype device that can integrate electricity generation and high-pressure air production.

The prototype device integrating electricity generation and high-pressure air production can meet the demand of some manufacturing processes: use single power for both electricity generation and high-pressure air production. However, there are still the following shortcomings to be improved:
1. The rotation shaft of the generator has to be directly connected to the air compressor, and as a result, the heat from the generator will be transmitted through the rotation shaft to the air compressor; also, the engine is directly coupled with the generator, causing mutual heat transmission and affected operation.
2. In order for the rotation shaft to be directly connected to the air compressor, apart from inconvenient assembly and excessive time and labor consumption, the currently sold air compressors will have to be altered or re-designed for direct connection of the rotation shaft. It is obviously inconvenient and costly.

BRIEF SUMMARY OF THE INVENTION

The objective of the present invention is to provide an electricity and air supplying device that can use single power for electricity generation and high-pressure air production, and that can have the effect of heat insulation and easy assembly.

To realize the above objective, the present invention provides an electricity and air supplying device that comprises: a motor, having a transmission shaft; a generator unit, having a generating wheel; a clutch mechanism, having a first clutch shaft and a second clutch shaft that can selectively be engaged or disengaged; an air compressor, having an air compressing wheel; and a belt assembly, including a first belt connecting the transmission shaft and the generating wheel, a second belt connecting the generating wheel and the first clutch shaft, and a third belt connecting the second clutch shaft and the air compressing wheel. Through the first belt, the motor drives the generator unit to run and generate electricity, meanwhile, through the second belt, the generator unit drives the first clutch shaft to rotate, and through the third belt, the second clutch shaft drives the air compressor to operate and produce high-pressure air.

Comparing to the prior art, the present invention offers the following effects: the effect of using single power for both electricity generation and high-pressure air production, and the effect of heat insulation and easy assembly.

DETAILED DESCRIPTION OF THE INVENTION

Detailed descriptions and technical contents of the present invention are provided below with reference to the accompanying drawings. However, the accompanying drawings are provided for the purposes of reference and description only, and are not intending to limit the scope of the present invention.

Figure 1:
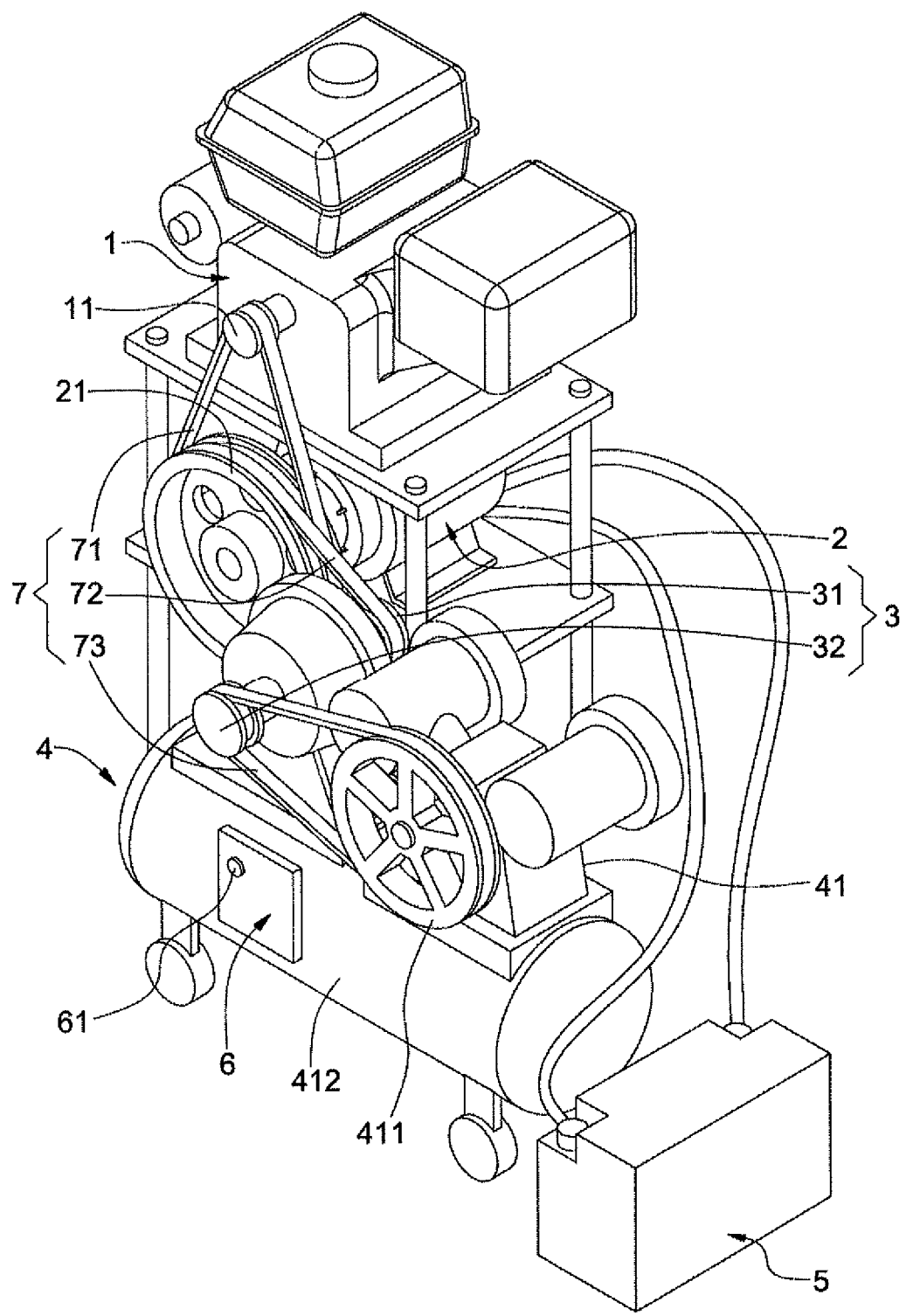
FIG. 1 is a front perspective view of the supplying equipment of the present invention.
Figure 2:
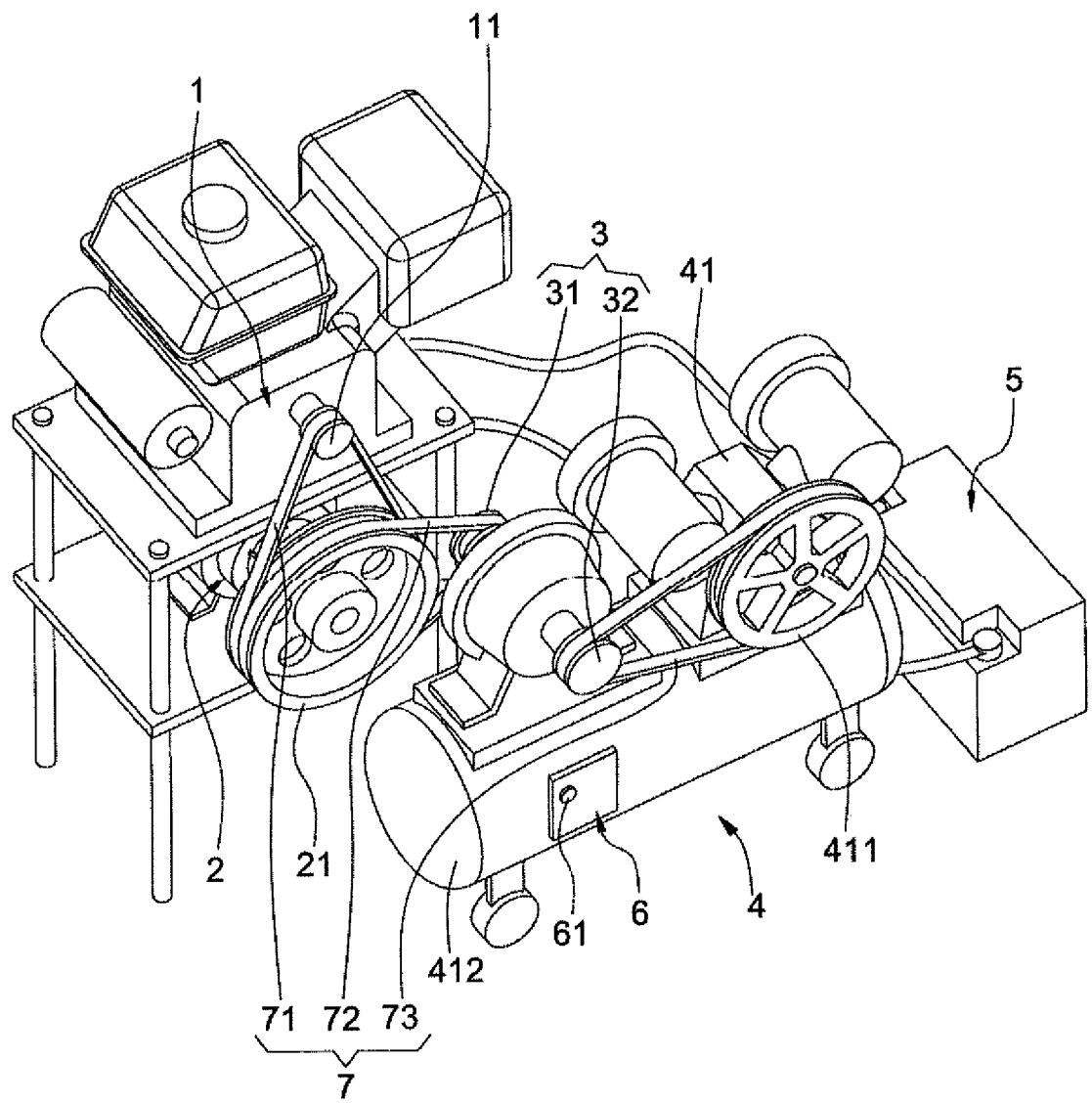
FIG. 2 is a perspective view of the supplying equipment of the present invention from another angle.
Figure 3:
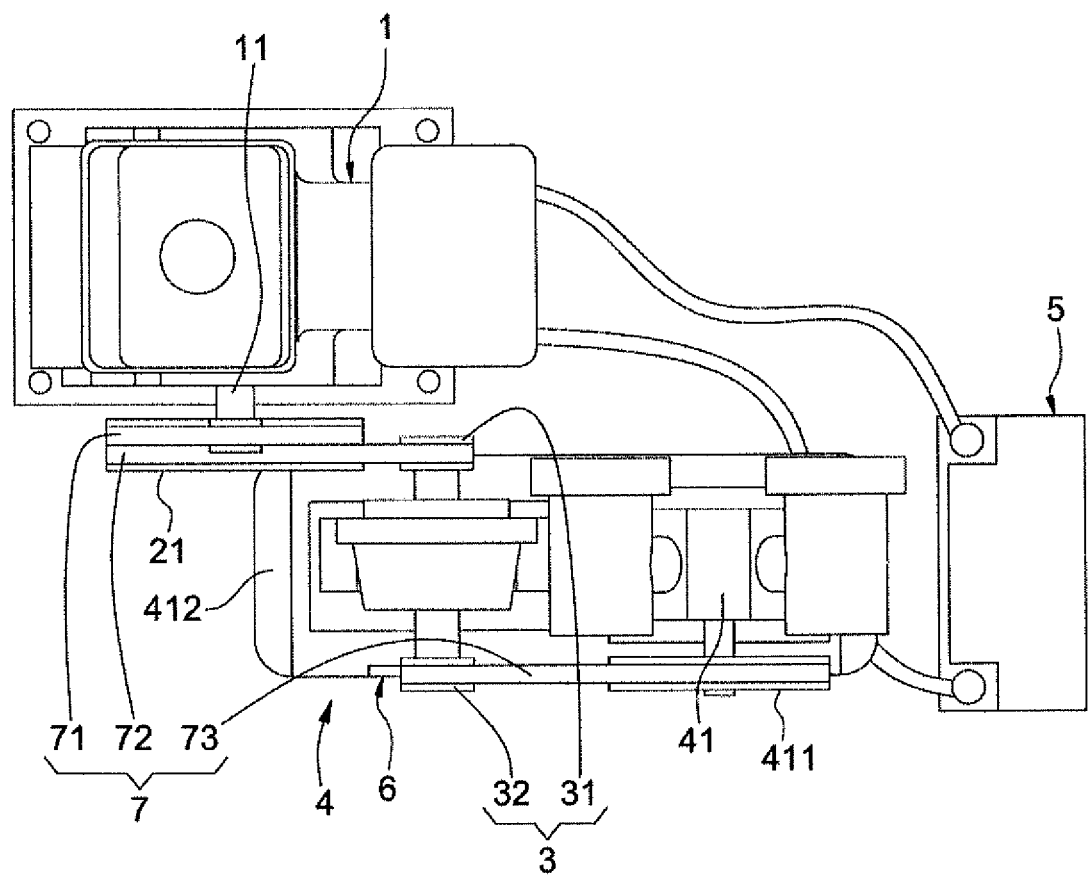
FIG. 3 is a top view of the supplying equipment of the present invention.

Referring to FIGS. 1 to 3, the present invention provides a kind of electricity and supplying equipment that can use single power for both electricity generation and high-pressure air production. The supplying equipment of the present invention comprises a motor 1, a generator unit 2, a clutch mechanism 3, an air compressor 4 and a belt assembly 7, and preferably, it also comprises an electricity storage device 5 and a controller 6.

The motor 1 can be any device that can produce power. In the present embodiment, an internal combustion engine is used as an example for description. The motor 1 has a transmission shaft 11, and the transmission shaft 11 is used for transmission.

The generator unit 2 can be any device that can be driven to generate electricity. In the present embodiment, a high-efficiency generator unit is used as an example for description. The generator unit 2 has a generating wheel 21. When the generating wheel 21 is driven to rotate, the generator unit 2 will start to generate electricity. The generated electricity can be directly supplied to any electric appliance, or to the electricity storage device 5 for storage.

The clutch mechanism 3 is a clutch mechanism 3 that can be engaged or disengaged for transmission. In the present embodiment, a clutch mechanism 3 having a first clutch shaft 31 and a second clutch shaft 32 is used as an example for description, and the first clutch shaft 31 and the second clutch shaft 32 can be engaged or disengaged for transmission.

The air compressor 4 can produce high-pressure air. In the present embodiment, an example is taken for description as below: the air compressor 4 preferably has an air compressing unit 41, and the air compressing unit 41 has an air compressing wheel 411. When the air compressing wheel 411 is driven to rotate, the air compressing unit 41 will start to produce high-pressure air and store it in an air storage tank 412 of the air compressor 4.

The belt assembly 7 includes a first belt 71, a second belt 72 and a third belt 73, and these belts 71, 72, 73 preferably are all non-conductor belts, so that heat can be insulated by each of the belts 71, 72, 73 for the effect of heat insulation.

The first belt 71 is connected between the transmission shaft 11 and the generating wheel 21, the second belt 72 is connected between the generating wheel 21 and the first clutch shaft 31, and the third belt 73 is connected between the second clutch shaft 32 and the air compressing wheel 411.

Thus, when the motor 1 is started, through the first belt 71, the motor 1 will drive the generator unit 2 to run and generate electricity, and meanwhile, through the second belt 72, the generator unit 2 drives the first clutch shaft 31 to rotate; when the clutch mechanism 3 is controlled to be in the engaged state, the first clutch shaft 31 will drive the second clutch shaft 32 to rotate, and then, through the third belt 73, the second clutch shaft 32 drives the air compressor 4 to operate. In particular, when the generator unit 2 is driven to run and generate electricity, the electricity generated will be supplied directly to an electric appliance (not shown in the drawings) or be stored; when the air compressing unit 41 of the air compressor 4 is driven to rotate, it will start to produce high-pressure air and store the air in the air storage steel tank 412 of the air compressor 4.

Therefore, the supplying equipment of the present invention can use the motor 1 as single power to drive the generator unit 2 for electricity generation and to drive the air compressor 4 for high-pressure air production, and fully use the power of the motor 1 to supply both electricity and air, and since each of the driving components and driven components are connected only by non-conductor belts (first to third belts 71, 72, 73) (i.e., no heat conducting objects are connected in between), the present invention has an effect of heat insulation, for example, the heat from the motor 1 or the generator unit 2 will not be transmitted to the clutch mechanism 3 or the air compressor 4. Moreover, the supplying equipment of the present invention can directly use the second belt 72 and the third belt 73 to respectively connect the clutch mechanism 3 and the air compressor 4, no alteration to the original design is required for the clutch mechanism 3 and the air compressor 4. Therefore, the assembly is very convenient. It can not only save time and effort, but also reduce cost.

Preferably, the present invention further includes an electricity storage device 5, and the electricity storage device 5 is electrically connected to the generator unit 2, so that the electricity generated by the generator unit 2 can be supplied to the electricity storage device 5 for storage.

Preferably, the present invention further includes a controller 6, and the controller 6 has an air pressure sensing component 61. The air pressure sensing component 61 will detect the air pressure inside the air storage steel tank to produce an actual air pressure value, and the controller 6 will compare the actual air pressure value with a preset air pressure value, and control the engagement or disengagement of the clutch mechanism 3. For example, if the actual air pressure value is lower than the preset air pressure value, it means the high-pressure air is insufficient. At this time, the controller 6 will automatically control the first clutch shaft 31 and the second clutch shaft 32 of the clutch mechanism 3 to be engaged, so as to drive the air compressor 4 to produce more high-pressure air. If the actual air pressure value is equal to or higher than the preset air pressure value, it means the high-pressure air is sufficient. At this time, the controller 6 will automatically control the first clutch shaft 31 and the second clutch shaft 32 of the clutch mechanism 3 to be disengaged, so as to stop the production of high-pressure air, but the motor 1 will still drive the generator unit 2 to continue the generation of electricity.

Said controller 6 can be configured on said air storage steel tank of the air compressor 4, so that the air pressure sensing component 61 can easily detect the air pressure inside the air storage steel tank.

To summarize, the electricity and air supplying equipment of the present invention can truly accomplish the expected object and solve the shortcomings of the prior art. Also, giving the prominent novelty and inventive step, it completely meets the prerequisites for a invention patent application. Therefore, the inventor is filing an application in accordance with the Patent Law. Please examine and approve the patent so that the inventor's rights can be protected.

What is disclosed above is merely a preferred and feasible embodiment of the present invention, and is not intending to limit the scope of the present invention. All equivalent structural variations based on the descriptions and drawings of the present invention shall naturally be included in the scope of the present invention, as claimed below.

We claim:

1. An electricity and air supplying apparatus comprising:
a motor having a transmission shaft;
a generator unit housing a generator wheel;
a clutch mechanism having a first clutch shaft and a second clutch shaft in which the clutch mechanism selectively engages or disengages the first clutch shaft with respect to the second clutch shaft;
an air compressor having an air compressing wheel, the air compressor having an air storage tank adapted to store pressurized air; and
a belt assembly having a first belt and a second belt and a third belt, the first belt engaged with the transmission shaft and the generating wheel, the second belt engaged with the generating wheel and the first clutch shaft, the third belt engaging the second clutch shaft and the air compressing wheel, wherein the motor drives the transmission shaft in rotation so that the first belt drives the generating wheel in rotation such that the generator unit produces electricity, wherein the generator unit drives the second belt so as to cause the first clutch shaft to rotate, wherein the second clutch shaft drives the third belt so as to cause the air compressing wheel to rotate such that the air compressor produces pressurized air and stores the pressurized air in the air storage tank, the air storage tank adapted to allow the pressurized air therein to be an output air supply source.

2. The electricity and air supplying apparatus of claim 1, further comprising:
an electricity storage device connected to the generator unit so as to store the electricity produced by the generator unit.

3. The electricity and air supplying apparatus of claim 1, wherein the first belt, the second belt and the third belt are non-conductive belts, wherein the motor, the generator unit, the clutch mechanism and the air compressor are only connected to each other through the non-conductive belts.

4. The electricity and air supplying apparatus of claim 1, further comprising:
a controller having an air pressure sensing component adapted to detect air pressure in the air compressor and to display such detected air pressure, the controller comparing an actual air pressure with a preset air pressure value so as to selectively control the engagement or disengagement of the clutch mechanism.

* * * * *